United States Patent
Wei et al.

(10) Patent No.: US 8,478,908 B2
(45) Date of Patent: Jul. 2, 2013

(54) FIELDBUS GATEWAY USING VIRTUAL SERIAL FILEDBUS PORT AND DATA TRANSMISSION METHOD THEREOF

(75) Inventors: Bo Er Wei, Taipei (TW); Chun Fu Chuang, Taipei (TW)

(73) Assignee: Moxa Inc., Shing Tien (TW)

( * ) Notice: Subject to any disclaimer, the term of this patent is extended or adjusted under 35 U.S.C. 154(b) by 156 days.

(21) Appl. No.: 12/910,930

(22) Filed: Oct. 25, 2010

(65) Prior Publication Data

US 2012/0102240 A1   Apr. 26, 2012

(51) Int. Cl.
*G06F 3/00* (2006.01)
(52) U.S. Cl.
USPC ............ 710/11; 710/5; 710/7; 710/8; 710/20; 710/29; 710/33; 710/36
(58) Field of Classification Search
USPC .......................... 710/5, 7, 8, 11, 20, 29, 33, 36
See application file for complete search history.

(56) References Cited

U.S. PATENT DOCUMENTS

| | | | |
|---|---|---|---|
| 7,246,193 B2* | 7/2007 | Rotvold et al. | 710/311 |
| 7,246,194 B2* | 7/2007 | Train et al. | 710/311 |
| 8,046,499 B2* | 10/2011 | Seiler | 709/253 |
| 2005/0228509 A1* | 10/2005 | James | 700/19 |
| 2009/0018672 A1* | 1/2009 | Gienke | 700/1 |
| 2010/0077111 A1* | 3/2010 | Holmes et al. | 710/33 |
| 2010/0204959 A1* | 8/2010 | Thoren et al. | 702/186 |
| 2011/0082570 A1* | 4/2011 | Caffrey et al. | 700/90 |
| 2012/0087656 A1* | 4/2012 | Rourke et al. | 398/43 |

OTHER PUBLICATIONS

K. Thramboulidis, Development of Distributed Industrial Control Applications: The CORFU Framework, Aug. 28, 2002, 4th IEEE International Workshop on Factory Communication Systems, Vasteras, Sweden. pp. 1-8.*

* cited by examiner

*Primary Examiner* — Idriss N Alrobaye
*Assistant Examiner* — Jasjit Vidwan
(74) *Attorney, Agent, or Firm* — Bacon & Thomas, PLLC

(57) ABSTRACT

A fieldbus gateway using a virtual serial fieldbus port and a data transmission method thereof are provided. By receiving a fieldbus frame containing target data through a virtual serial fieldbus port connected to a source device or a target device via a fieldbus gateway and sending another fieldbus frame containing the target data via other fieldbus port to target devices or source devices, the system and the method can provide two or more remote devices to control one controlled device at the same time. The invention also achieves the effect of using one virtual serial fieldbus port to transmit data between multiple source devices and target devices concurrently.

9 Claims, 11 Drawing Sheets

| 600 | 610 | 620 | 630 |
|---|---|---|---|
| | 01~10 | Modbus TCP | 192.168.2.8 |
| | 11~20 | Modbus TCP | 192.168.4.13 |
| | 21~30 | Modbus RTU | First virtual serial fieldbus port (virtual Modbus RTU port) |
| | 31~40 | Modbus RTU | Second virtual serial fieldbus port (virtual Modbus RTU port) |
| | 41~50 | Modbus ASCII | First serial fieldbus port (Modbus ASCII port) |
| | 51~60 | Modbus ASCII | Second serial fieldbus port (Modbus ASCII port) |

FIG. 4

FIELDBUS GATEWAY USING VIRTUAL SERIAL FILEDBUS PORT AND DATA TRANSMISSION METHOD THEREOF

BACKGROUND OF THE INVENTION

1. Field of Invention

The invention relates to a fieldbus gateway and the data transmission method thereof In particular, the invention relates to a fieldbus gateway using a virtual serial fieldbus port and the data transmission method thereof.

2. Related Art

During the development of fieldbus, the industrial Ethernet-based fieldbus protocols, such as ProfiNet, Modbus TCP, and Ethernet/IP, are later than the serial-based fieldbus protocols, such as Profibus and Modbus RTU/ASCII. Moreover, the architecture of the industrial Ethernet-based fieldbus protocols is more complicated. Therefore, most of current supervisory control and data acquisition (SCADA) systems or human machine interfaces (HMI) only support serial-based fieldbus instead of Ethernet-based fieldbus. Or one has to pay extra fees in order to obtain the Ethernet-based fieldbus support. Users of the SCADA system and HMI can only use the serial fieldbus port to communicate with the controlled device. However, since most of current factory automation requires that the remote control center and factory operators could control the controlled device at the same time, the controlled device should be able to receive the controls of a remote SCADA system and a local HMI concurrently. However, the system only uses serial fieldbus communication is difficult to provide this function. Due to its physical properties, the serial fieldbus cannot transmit data over a long distance directly. Repeaters are always required for extending the transmission distance, but they also increase the cost of wiring.

To avoid the cost increasing on wiring, some factories use a fieldbus gateway at both the remote and local ends, respectively. The two fieldbus gateways communicate via an Ethernet. Although this reduces the cost on long-distance wiring, at least two fieldbus gateways are needed. To reduce the number of required gateways, some factories use a device server for the system only requires RS-232/RS-422/RS-485 based serial fieldbus communication. The COM port redirection technique used on a device server provides a low cost long distance transmission. As shown in FIG. 1, the remote SCADA system 101a uses the COM port redirection driver to generate a mapped virtual COM port, the COM port is mapped to a physical serial port on the local device server 700. That is, all operations on the mapped virtual COM port on the SCADA system would be transmitted via the network to the device server 700. Then the device server 700 does the same operations on the physical serial port. This makes the mapped virtual COM port works as a mapped interface of the physical serial port on the device server 700. For example, as the SCADA server 101a sets the RTS pin of the mapped COM port to output active signals, the RTS pin on the physical serial port of the device server 700 would output active signals. Then the CTS pin of the physical serial port of a programmable logic controller 301a (controlled device) connected with the physical serial port of the device server 700 receives the active signals. On the other hand, if the programmable logic controller 301a transmits data via its serial port to the physical serial port of the device server 700, then the device server 700 would forward the received data to the mapped COM port of the SCADA system 101a via the network. So the SCADA system 101a can concurrently receive the data from the programmable logic controller 301a (controlled device).

Through this serial tunnel technology, the physical serial port of the local device server 700 is just like the real COM port of the remote SCADA system 101a, thereby connecting with the programmable logic controller 301a.

Although the COM port redirection technique only needs one additional device server to extend the serial communication distance, the COM port redirection establish a dedicated tunnel between the physical serial port of the device server 700 and the mapped virtual COM port (interface) of the SCADA system 101a. Therefore, when using the COM port redirection technique, the physical serial port of the device server 700 could only be occupied by the established tunnel The physical serial port of the device server only allows one SCADA system 101a (mapped virtual COM port) to communicate with and/or control over a programmable logic controller at a time. It can't work on the system requires the programmable logic controller 301a to be controlled by multiple remote/local control ends concurrently.

In summary, the prior art always has the problem that it is impossible for more than two remote devices to control the same controlled device via serial fieldbus at the same time. It is therefore imperative to provide a solution.

SUMMARY OF THE INVENTION

In view of the foregoing, the invention discloses a fieldbus gateway using a virtual serial fieldbus port and the data transmission method thereof.

The disclosed fieldbus gateway using a virtual serial fieldbus port includes: a plurality of first fieldbus ports connected with several source devices, each of the first fieldbus ports being a network fieldbus port, virtual serial or physics serial fieldbus port; a plurality of second fieldbus ports connected with several target devices, each of the second fieldbus ports being a network fieldbus port, virtual serial or physics serial fieldbus port, and at least one of the first fieldbus ports and the second fieldbus ports being a virtual serial fieldbus port; at least one first data processing module for processing the fieldbus protocol corresponding to the first fieldbus ports, thereby receiving fieldbus frames transmitting from the source devices via the first fieldbus ports; a routing module for selecting a fieldbus protocol and a second fieldbus port corresponding to the selected fieldbus protocol according to the fieldbus frame; a frame format converting module for converting the fieldbus frame into the fieldbus frame format used by the second fieldbus ports when the protocols of the first and second fieldbus ports are different; and at least one second data processing module for processing the fieldbus protocol corresponding to each of the second fieldbus ports and transmitting the fieldbus frame to the target devices via the second fieldbus ports.

Another disclosed fieldbus gateway using a virtual serial fieldbus port includes: a storage module; a plurality of first fieldbus ports connected with several second devices/first devices; a plurality of second fieldbus ports connected with the first devices/second devices, at least one of the first fieldbus ports and second fieldbus ports being a virtual serial fieldbus port; at least a third data processing module for periodically receiving target data via the first fieldbus ports; an access controlling module for storing the target data received by the third data processing modules in the addresses of the storage module corresponding to the first/second devices, and for reading the target data from the specified address of the storage module; and at least a fourth data processing module for periodically transmitting the target data read out by the access controlling module via the second fieldbus ports.

The disclosed data transmission method of using a virtual serial fieldbus port includes the steps of: connecting a plurality of source devices with a fieldbus gateway via a plurality of first fieldbus ports; connecting the fieldbus gateway with a plurality of target devices via a plurality of second fieldbus ports; transmitting a fieldbus frame containing target data from the source devices to the fieldbus gateway via the first fieldbus ports; selecting a second fieldbus protocol and the corresponding second fieldbus port according to the fieldbus frame by the fieldbus gateway; converting the fieldbus frame into the fieldbus frame format used by the second fieldbus port when the fieldbus gateway determines that the protocols used by the second fieldbus ports and the first fieldbus ports are different; and transmitting the fieldbus frame from the fieldbus gateway to the target devices via the second fieldbus ports.

As described above, the disclosed device and method differ from the prior art in that the invention connects the fieldbus gateway to source devices and target devices via a virtual fieldbus port and any fieldbus port. It transmits fieldbus frames between the source devices and the target devices, or synchronizes data on the target devices with itself. It further allows the source devices to access the data thereon. It solves the problems in the prior art by providing remote source devices or target devices to use a virtual serial fieldbus port, achieving long-distance communications using a serial fieldbus protocol. Moreover, source devices/target devices can use a single virtual serial fieldbus port to communicate with several target devices/source devices concurrently.

BRIEF DESCRIPTION OF THE DRAWINGS

The invention will become more fully understood from the detailed description given herein below illustration only, and thus is not limitative of the present invention, and wherein:

FIG. 4 is a schematic view of the routing table according to the invention.

DETAILED DESCRIPTION OF THE INVENTION

The present invention will be apparent from the following detailed description, which proceeds with reference to the accompanying drawings, wherein the same references relate to the same elements.

Figure 1:
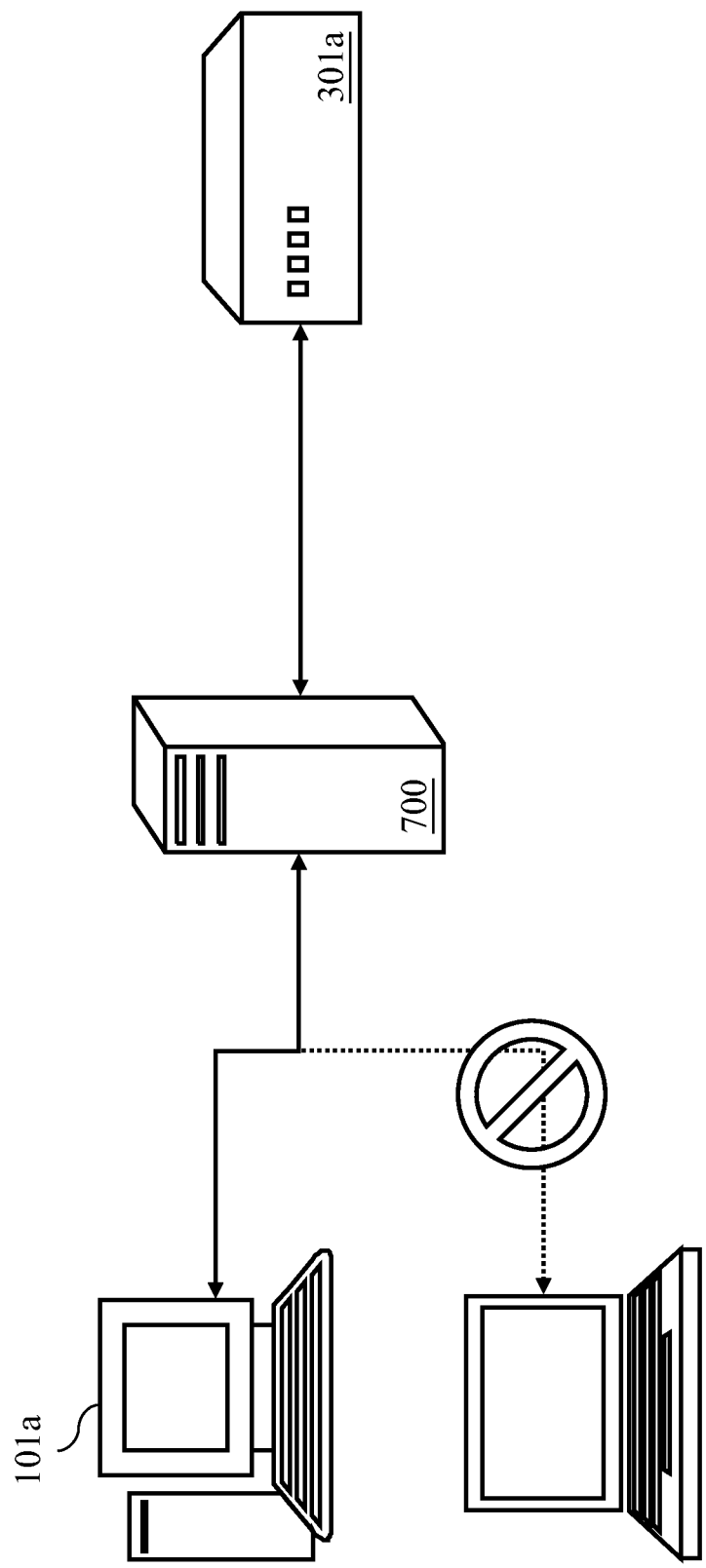
FIG. 1 shows the structure of a conventional serial tunnel system.
Figure 2:
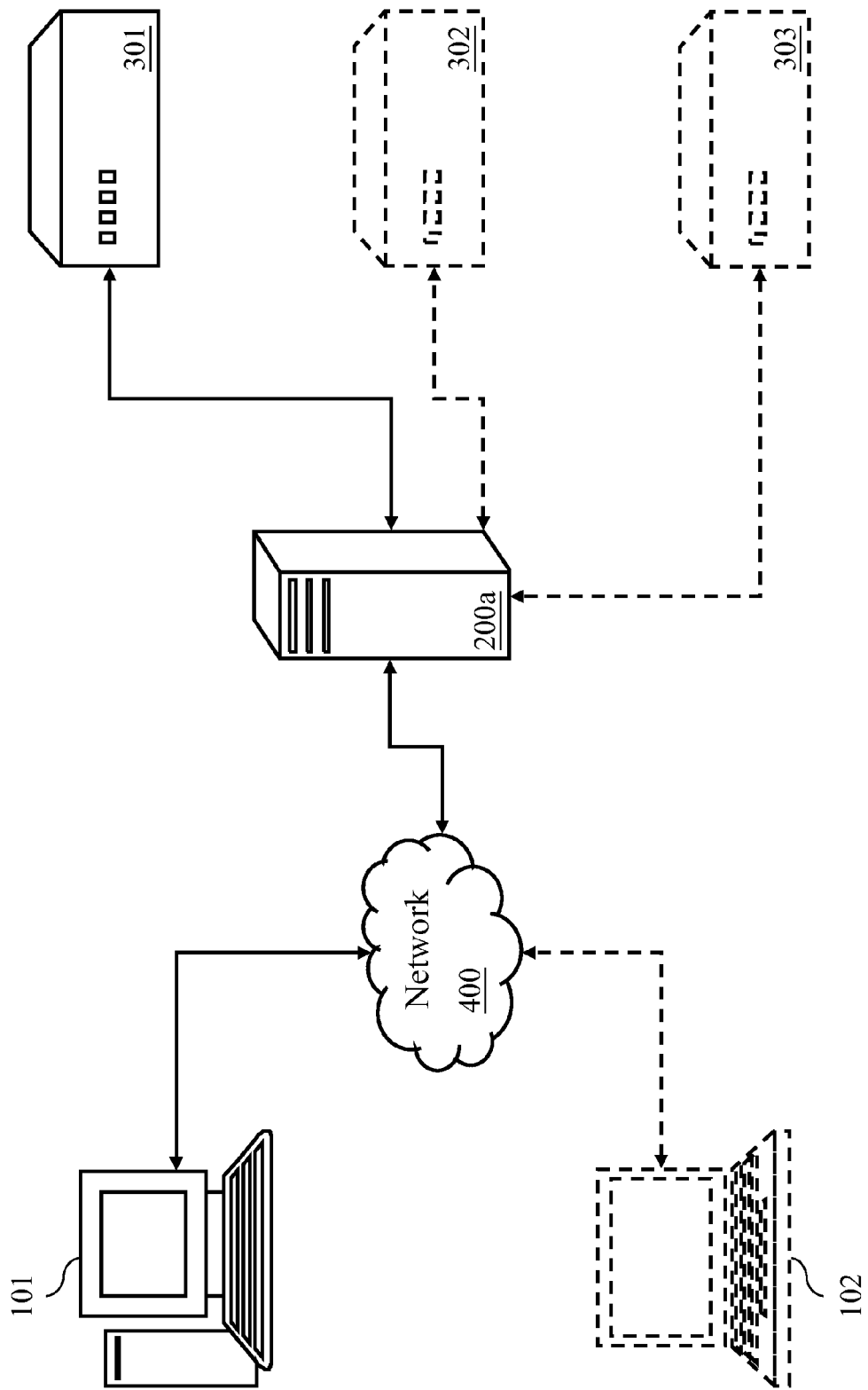
FIG. 2 shows the structure of a data transmitting system that uses the disclosed virtual serial fieldbus port.

The invention is used in the system with the structure as shown in FIG. 2. The first network device 101 connects to the virtual serial fieldbus port of the fieldbus gateway 200a via a network 400. The first serial fieldbus device 301 directly connects to the serial fieldbus port of the fieldbus gateway 200a using a serial fieldbus connecting cable. However, the invention is not limited to this particular example. That is, the disclosed system structure is not limited to one network device and one serial fieldbus device. It may consist of one first network device 101, one fieldbus gateway 200a, and many serial fieldbus devices. Alternatively, it may consist of several network devices, one fieldbus gateway 200a, and one first serial fieldbus device 301. It may even consist of several network devices, several serial fieldbus devices, and one fieldbus gateway 200a. None of these should be used to restrict the scope of the invention. It should be noted that the disclosed system structure includes only one fieldbus gateway 200a. The first network device 101 may use a virtual fieldbus port to communicate with other network devices (e.g., a second network device 102) via the fieldbus gateway 200a. It is not limited to the communications with the serial fieldbus devices (301, 302, and 303). Besides, the fieldbus gateway 200a and the second network device 102 can be connected using a virtual fieldbus port or a network fieldbus port.

According to the invention, the device that transmits data to the fieldbus gateway 200a is called a "source device". The device that receives the data from the fieldbus gateway 200a is called a "target device". For example, during the communications between a master device and a slave device of the fieldbus, when a request sent out from the master device to the slave device via the fieldbus gateway 200a, the master device is the "source device" and the slave device is the "target device". When the slave device sends out the response to this request back to the master device via the fieldbus gateway 200a, the slave device becomes the "source device" and the master device becomes the "target device". According to FIG. 2, the first network device 101/the first serial fieldbus device 301 is not necessarily the source device/target device. If the first serial fieldbus device 301 transfers data to the first network device 101 via the fieldbus gateway 200a, then the first serial fieldbus device 301 is the source device and the first network device 101 is the target device.

In FIG. 2, the first network device 101 is connected with the fieldbus gateway 200a via the network 400. In order to transmit the data or signals of the serial fieldbus via the network 400, the first network device 101 executes a virtual serial fieldbus port driver or middleware to generate a virtual serial fieldbus port that uses the network 400 to transmit serial signals. The fieldbus gateway 200a also executes the virtual serial fieldbus port driver or middleware to generate a virtual serial fieldbus port.

In FIG. 2, the first network device 101 can use the virtual serial fieldbus port thereof to transmit target data to the fieldbus gateway 200a. The fieldbus gateway 200a can use the virtual serial fieldbus port thereof to receive the target data transmitted from the first network device 101. It further transfers the received target data to the first serial fieldbus device 301 via a serial fieldbus port. At the same time, the first serial fieldbus device 301 can also use the serial fieldbus to transmit the target data to the fieldbus gateway 200a. The fieldbus gateway 200a also uses the virtual serial fieldbus port thereof to transfer the target data from the first serial fieldbus device 301 to the first network device 101. The first network device 101 also uses the virtual serial fieldbus port thereof to receive the target data transferred by the fieldbus gateway 200a. Therefore, the first network device 101 can use the virtual serial fieldbus port thereof to communicate with the first serial fieldbus device 301 as directly using a physical serial fieldbus port.

The fieldbus frame which includes the target data transmitted from the first network device 101 usually contains a destination address and/or a source address. The fieldbus gateway 200a thus follows the destination address and/or the source address to transfer the target data to the corresponding serial fieldbus device. Therefore, when the disclosed system includes several serial fieldbus devices, the fieldbus gateway 200a can still transfer the target data from the first network device 101 to the right target device. Besides, the fieldbus gateway 200a can generate several virtual serial fieldbus ports in order to communicate with several network devices. It should be noted that the network device in the invention only needs one virtual serial fieldbus port for communications with several serial fieldbus devices. Using different virtual serial fieldbus ports for different serial fieldbus devices is not required.

Figure 3A:
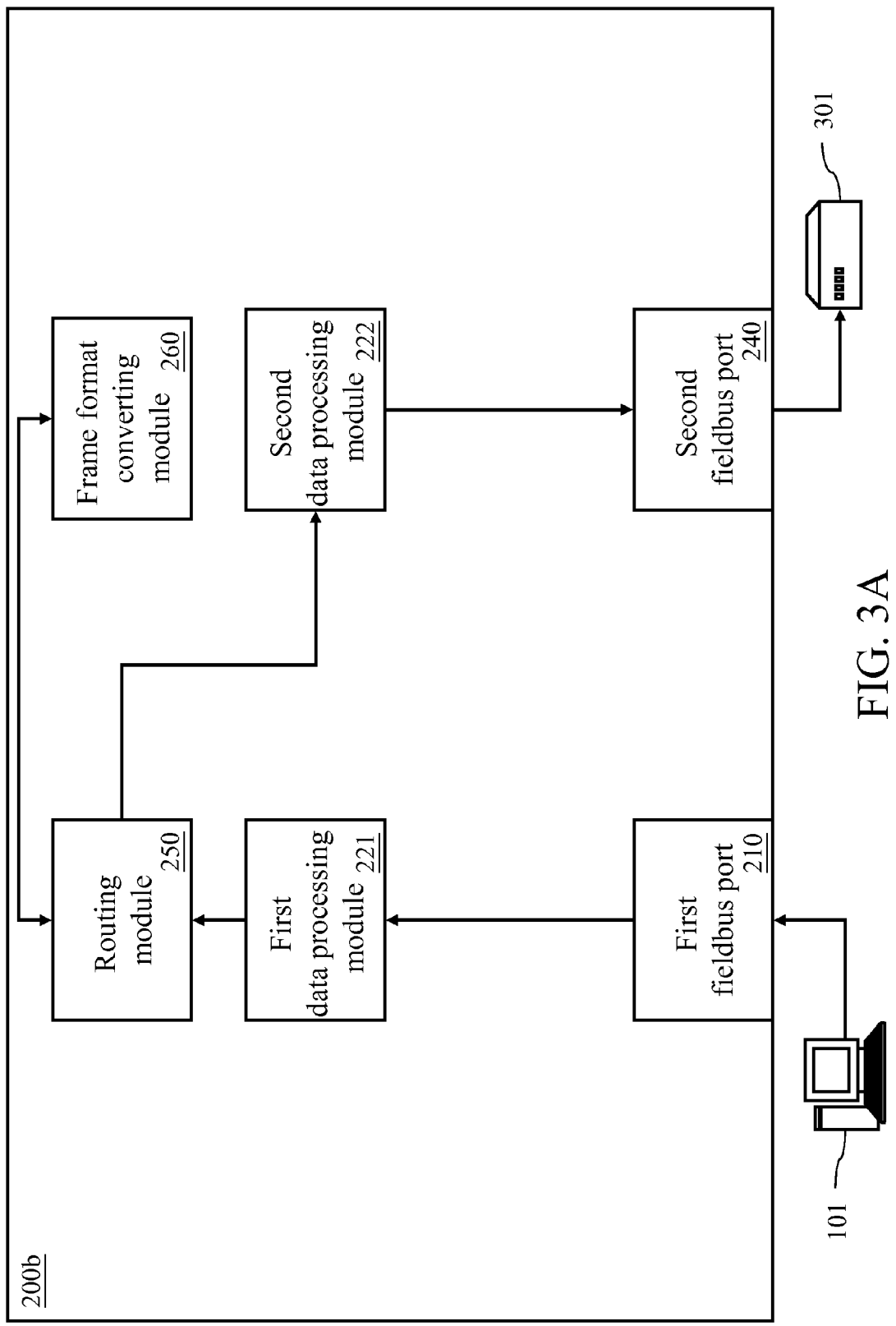
FIG. 3A is a schematic view of elements in the fieldbus gateway using a virtual serial fieldbus port.

In the following, FIG. 3A is used to explain how a first embodiment of the invention works. As shown in the drawing, the disclosed fieldbus gateway 200b includes a first fieldbus port 210, a first data processing module 221, a second data processing module 222, a second fieldbus port 240, a routing module 250, and a frame format converting module 260.

It should be noted that the fieldbus gateway 200b can include one or several first fieldbus ports 210 and one or several second fieldbus ports 240. In general, the fieldbus gateway 200b includes a network fieldbus port, several virtual serial fieldbus ports and several serial fieldbus ports. However, the disclosed fieldbus gateway is not limited to this particular example. Various fieldbus ports use the corresponding fieldbus to transmit data. For example, the network fieldbus port corresponds to a network fieldbus, and both the virtual serial fieldbus port and the serial fieldbus port correspond to a serial fieldbus. The serial fieldbus of the invention includes: a fieldbus using special serial interface as a physical layer (such as Profibus, CAN Bus, Foundation Fieldbus, Modbus Plus, etc) or a fieldbus using the basic RS-232/RS-422/RS-485 as a physical layer (such as Modbus RTU/ASCII, DF1, CC-Link, etc).

When the first fieldbus ports 210 and the second fieldbus ports 240 are network fieldbus ports or serial fieldbus ports, the first fieldbus ports 210/the second fieldbus ports 240 receive/transmit fieldbus frames via the corresponding fieldbus interfaces. For example, when the first fieldbus ports 210/the second fieldbus ports 240 are network fieldbus ports, the first fieldbus ports 210/the second fieldbus ports 240 in practice can be TCP/IP protocol stack and network interface driver and receive/transmit fieldbus frames via the network interface. When the first fieldbus ports 210/the second fieldbus ports 240 are serial fieldbus ports, the first fieldbus ports 210/the second fieldbus ports 240 in practice can be drivers of the serial fieldbus interfaces and receive/transmit fieldbus frames via the serial fieldbus interface. These practical examples should not be used to restrict the scope of the invention.

Figure 3B:
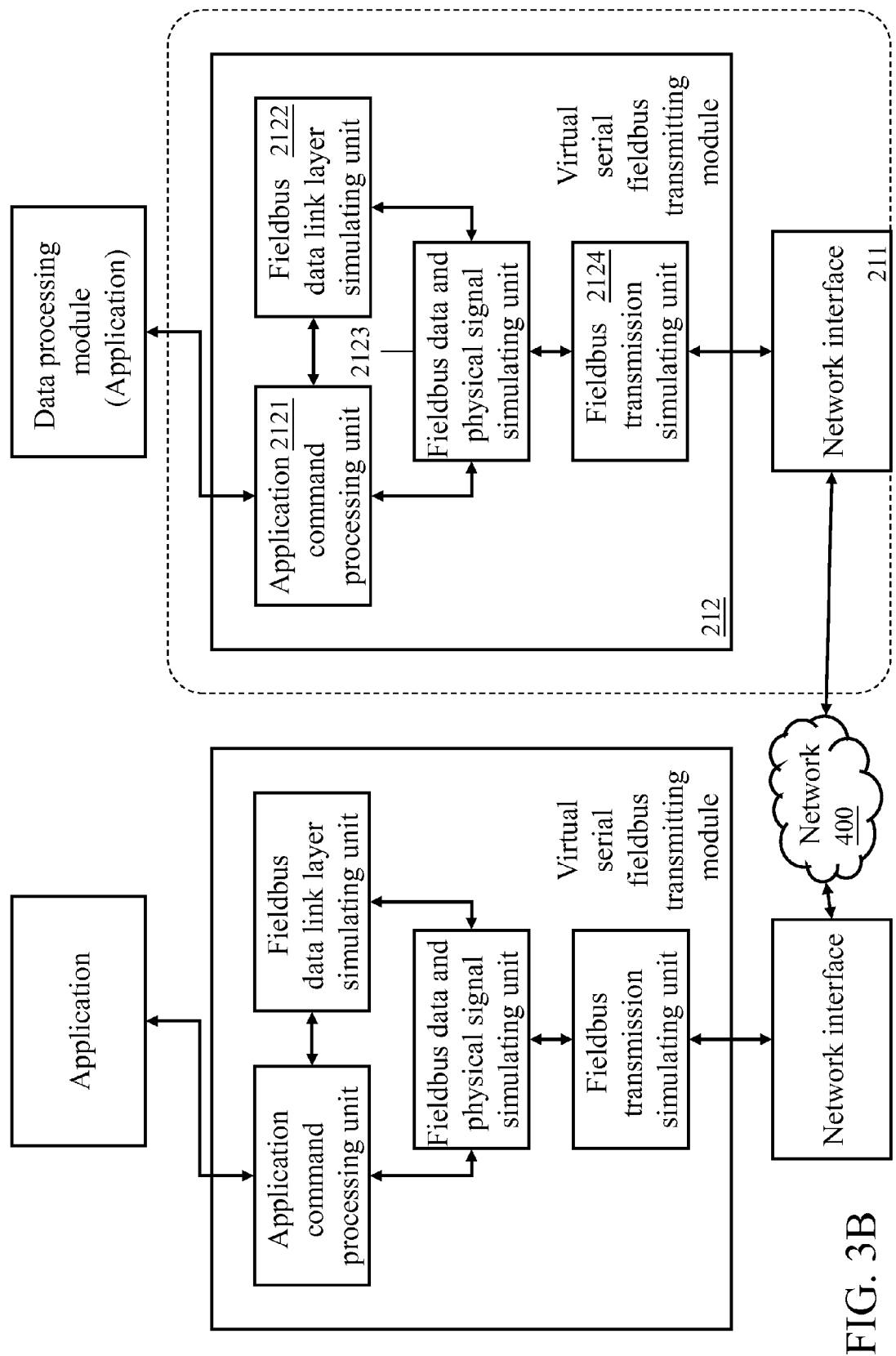
FIG. 3B is a schematic view of elements in the disclosed virtual serial fieldbus port.

When the first fieldbus ports 210/the second fieldbus ports 240 are virtual serial fieldbus ports, the first fieldbus ports 210/the second fieldbus ports 240 can simulate the physical serial fieldbus and communicate via the network 400. This includes transmitting data, physical signals, and simulating data link layers via the network 400. When the first fieldbus ports 210 or the second fieldbus ports 240 are virtual serial fieldbus ports, the first fieldbus ports 210 or the second fieldbus ports 240 include a virtual serial fieldbus transmitting module 212 and at least one network interface 211, as shown in FIG. 3B.

The network interface 211 connects to the source devices/target devices via the network 400, receiving/transmitting virtual serial fieldbus frames. The network interface 211 can be the Ethernet, wireless, satellite communicating, or infrared interfaces. The invention is not limited to these examples.

The virtual serial fieldbus transmitting module 212 can in practice be a virtual serial fieldbus driver or middleware. It includes at least: an application command processing unit 2121, a fieldbus data link layer simulating unit 2122, a fieldbus data and physical signal simulating unit 2123, and a fieldbus transmission simulating unit 2124.

The application command processing unit 2121 receives commands from applications running in the fieldbus gateway 200a. According to the command, the application command processing unit 2121 reads/writes data, controls and sets physical signals, reads transmission and physical signal statuses in the fieldbus data and physical signal simulating unit 2123 or the fieldbus data link layer simulating unit 2122.

The fieldbus data link layer simulating unit 2122 simulates the processing mechanism of the data link layer as one provided by the physical fieldbus controller, such as the message arbitration function of the CAN Bus controller. When two CAN Bus nodes send out the bit "0" (dominant) and the bit "1" (recessive) simultaneously, the data on the bus will be the bit "0". When the controller of the node discovers that the data on the bus are different from the data being sent out, it stops sending out data immediately and would resend the data as bus available next time. Therefore, only messages with higher priorities are sent out. That is, taking the virtual serial fieldbus port of the CAN Bus as an example, the fieldbus data link layer simulating unit 2122 compares each bit in the received message and only keeps the one with a higher priority and returns the status of a failed transmission to the source device of the dropped message, thereby simulating a physical CAN Bus controller. Moreover, the fieldbus data link layer simulating unit 2122 of the Profibus, CAN Bus, and DF1 virtual serial fieldbus port can automatically return an acknowledge (ACK) message to the source device that sends out the message after successfully receiving the message, just like what the corresponding physical fieldbus controller does.

The fieldbus data link layer simulating unit 2122 also encapsulates the data transmitted from the application command processing unit 2121 into the simulated fieldbus frame and transmits it to the fieldbus data and physical signal simulating unit 2123.

The fieldbus data link layer simulating unit 2122 can also determine whether the received fieldbus frame is valid. If the fieldbus data link layer simulating unit 2122 determines that the fieldbus frame is invalid, it is simply dropped.

The fieldbus data link layer simulating unit 2122 also processes the data link layer behavior defined by the fieldbus protocol. For example, according to Modbus RTU/ASCII, Profibus, DF1, and CAN Bus fieldbus protocols, the command/data frame sent out from the source device has to be responded by the target device within a specific time; otherwise, the source device has to resend the command/data frame or abandon it and directly send the next command/data frame. Moreover, the source device has to wait until the previous command/data frame is successfully responded or abandoned due to timeout before sending a new command/data frame. The Profibus and Modbus Plus fieldbus protocols further define that the command/data frame is allowed to send only after a token is received, or how the token should be sent and received. All such acts belong to the behaviors of the fieldbus controller to be simulated by the fieldbus data link layer simulating unit 2122.

Furthermore, the fieldbus data link layer simulating unit 2122 can store the success/failure status of command/data frame transmission and the received fieldbus frame for the application command processing unit 2121 to read.

The functions executable by the fieldbus data link layer simulating unit 2122 are only some examples. The invention is not limited to these cases. Any data link layer processing mechanism that a physical fieldbus controller can provide can be included into the functions available in the disclosed fieldbus data link layer simulating unit 2122.

The fieldbus data and physical signal simulating unit 2123 simulates the behaviors of a fieldbus physical layer, such as the selection and settings of a virtual physical interface. When the fieldbus data and physical signal simulating unit 2123 selects and sets the virtual physical interface as a peer-to-peer physical interface, such as RS-232, the fieldbus data and physical signal simulating unit 2123 performs peer-to-peer network communications with a single target device via the fieldbus transmission simulating unit 2124. When the fieldbus data and physical signal simulating unit 2123 selects and sets the virtual physical interface as a multi-drop physical interface, such as CAN Bus, Profibus, Modbus Plus, RS-422, and RS485, the fieldbus data and physical signal simulating unit 2123 performs peer-to-peer or multi-drop network communications with a single or multiple target devices via the fieldbus transmission simulating unit 2124. It should be noted that the above-mentioned virtual physical interface selection and the network locations of target devices can be obtained by reading a user's setting file or preset by the user.

The fieldbus data and physical signal simulating unit 2123 allows the application command processing unit 2121 and the fieldbus data link layer simulating unit 2122 to set/read interface parameters of the virtual physical interface, including the interface type, the physical signal status, baud rate, and character coding. However, the invention is not limited to these examples. In particular, the character coding includes start bits, stop bits, data bits, and parity bits. Likewise, the above-mentioned functions of the fieldbus data and physical signal simulating unit 2123 are only some examples. Any physical layer behavior of the physical fieldbus can be simulated by the fieldbus data and physical signal simulating unit 2123.

The fieldbus data and physical signal simulating unit 2123 can also use specific data to simulate the transmission of physical signals. The fieldbus data and physical signal simulating unit 2123 can send the data via the fieldbus transmission simulating unit 2124 to a target device on the network. It also could set simulated physical signals by receiving the data frame from a source device on the network representing the physical signals of the source device. Suppose the fieldbus data and physical signal simulating unit 2123 wants to set its output pin, such as the RTS pin, as active, it first changes the stored value of its internal RTS (e.g., set as 1). Afterwards, the data representing the active RTS are transmitted via the fieldbus transmission simulating unit 2124 to a target device on the network, thereby notifying the target device that the simulated RTS pin of the source device has a change. For the input pin, such as the CTS pin, the physical signal change done by receiving data representing physical signals transmitted from a source device on the network. For example, after receiving the data representing that the RTS pin of the source device on the network becomes inactive, the stored value of the CTS pin on the target device is changed (e.g., set as 0). The matched connection relation between the simulated pins of the source device and the target device (e.g., connecting the CTS pin of the target device to the RTS pin of the source device) can also be obtained by reading a users setting file or preset by the user.

The fieldbus data and physical signal simulating unit 2123 can also transmit data sent from the application command processing unit 2121 and the command, data or status sent from the fieldbus data link layer simulating unit 2122 to a target device on the network via the fieldbus transmission simulating unit 2124 and the network interface 211. The received data or status sent from the source device on the network can be stored internally for the application command processing unit 2121 and the fieldbus data link layer simulating unit 2122 to access.

Furthermore, the fieldbus data and physical signal simulating unit 2123 can process the software or hardware flow control mechanism in serial fieldbus communications. For example, when use hardware RTS/CTS flow control, the fieldbus data and physical signal simulating unit 2123 changes the stored value of the CTS pin (e.g., set as 0) after receiving data representing that the RTS pin is inactive. The data transmitted from the application command processing unit 2121 and the fieldbus data link layer simulating unit 2122 are temporarily stored internally. The temporarily stored data are sent to the target device on the network via the fieldbus transmission simulating unit 2124 after the data representing that the RTS pin becomes active are received again.

The fieldbus transmission simulating unit 2124 establishes a network connection with a target device according to the settings of the fieldbus data and physical signal simulating unit 2123 on the virtual physical interface. For example, when the fieldbus data and physical signal simulating unit 2123 sets the virtual physical interface as peer-to-peer transmissions, it simulates peer-to-peer transmissions and establishes the network connection with a single target device. If the fieldbus data and physical signal simulating unit 2123 sets the virtual physical interface as multi-drop transmissions, it simulates multi-drop transmissions in order to establish network connections with multiple target devices.

The fieldbus transmission simulating unit 2124 can also accept connection requests from source devices on the network. The connection can be established using TCP/IP, UDP/IP, or PPP protocol. These should not be used to restrict the scope of the invention though.

Moreover, the fieldbus transmission simulating unit 2124 can transmit the data frames, command frames, physical signals, or status sent from the fieldbus data and physical signal simulating unit 2123 via the network interface 211 to a single target device (peer-to-peer transmissions) or concurrently to multiple target devices (multi-drop transmissions). Furthermore, the data frames, command frames, physical signals, or status of a source device received by the network interface 211 are transmitted to the fieldbus data and physical signal simulating unit 2123 for subsequent processing.

It should be noted that the virtual serial fieldbus port in practice can contain no fieldbus data link layer simulating unit 2122. In this case, the behaviors of the data link layer are completely processed by the application. For example, the Modbus RTU/ASCII, DF1, CC-Link fieldbus that use the common RS-232/RS-422/RS-485 as the physical layer often adopt this method to implement the virtual serial fieldbus port.

The following paragraphs continue to explain the modules in FIG. 3A.

The first data processing unit 221 processes behaviors defined by the fieldbus protocols such as ProfiNet, Ethernet/IP, Modbus TCP/UDP, Profibus, CAN Bus, Foundation Fieldbus, Modbus Plus, Modbus RTU/ASCII, and DF1. That is, the fieldbus protocol behaviors not included or handled by the first fieldbus port 210. For example, implementing the data processing module of the network fieldbus protocol "Ethernet/IP" needs to process all behaviors of the application layers (e.g., Ethernet/IP and CIP) defined by the protocol. The TCP/IP and physical layer under the application layers are processed by the first fieldbus port 210. When implementing the data processing module of the fieldbus protocol "Profibus", the first fieldbus port 210 is a virtual serial fieldbus port, i.e., a virtual Profibus port. The Profibus data processing module processes behaviors defined by Profibus above the data link layer. The data link layer and the physical layer are processed by the virtual Profibus port (first fieldbus port 210). When implementing the data processing module of the fieldbus protocol "Modbus RTU/ASCII", the first fieldbus port 210 is a virtual serial fieldbus port that contains no fieldbus data link layer simulating unit 2122, i.e., a virtual Modbus port. The implemented Modbus RTU/ASCII data processing module needs to process the application layer and data link layer behaviors unprocessed by the virtual Modbus port (first fieldbus port 210) defined by Modbus RTU/ASCII. The baud rate, flow control, character coding, and physical layer in the data link layer are processed by the virtual Modbus port. All the above-mentioned embodiments are only examples that should not be used to restrict the scope of the invention.

The first data processing module 221 can obtain the fieldbus frame received by the first fieldbus port 210 via the application interface corresponding to the first fieldbus port 210. It further extracts the target address and/or source address contained in the fieldbus frame, if any.

In fact, the first data processing module 221 can determine whether the fieldbus frame received by the first fieldbus port 210 is valid. Generally speaking, the first data processing module 221 determines the validity of the fieldbus frame by its format. For example, the first data processing module 221 can also determine the validity of the fieldbus frame by the check code therein. However, the validity checking method of the first data processing module 221 is not limited to these examples.

Besides, the first data processing module 221 can abandon the fieldbus frame returned by the routing module 250.

The second data processing module 222 is similar to the first data processing module 221. It also processes the behaviors defined by the network fieldbus protocol or serial fieldbus protocol. That is, the behaviors include protocol behaviors of all layers of the fieldbus that are not included or handled by the corresponding second fieldbus port 240.

The second data processing module 222 also uses the application interface corresponding to the second fieldbus port 240 to deliver the fieldbus frame provided by the routing module 250 to the second fieldbus port 240. The fieldbus frame is thus transmitted to the target device via the second fieldbus port 240.

Moreover, the second data processing module 222 can determine whether the target device is available to receive fieldbus frames at the moment through the application interface corresponding to the second fieldbus port 240. Suppose the second data processing module 222 determines that a fieldbus frame cannot be sent to the target device at the moment. This happens when, for example, the CTS pin of the second fieldbus port 240 connected with the target device is active, or the target device is busy and does not return a confirmation message. In this case, the second data processing module 222 can try again to transmit the fieldbus frame via the second fieldbus port 240 to the target device after a specific interval. That is, after the interval, the second data processing module 222 uses again the application interface corresponding to the second fieldbus port 240 to determine whether the target device is available to receive fieldbus frames at the moment. If so, the second data processing module 222 transmits the fieldbus frame via the second fieldbus port 240. If not, the second data processing module 222 keeps trying to send via the second fieldbus port 240 after the specific interval.

The routing module 250 selects a corresponding second data processing module 222 according to the target address, source address or source and target address extracted from the fieldbus frame by the first data processing module 221. The fieldbus frame containing the target data is provided to the second data processing module 222 selected by the routing module 250. The selected second data processing module 222 sends the fieldbus frame via the second fieldbus port 240 to the target device. When using only the target address as the determination basis, the routing module 250 can use a routing table 600 shown in FIG. 4 to select the second data processing module 222. For example, when the target address extracted by the first data processing module 221 is "21", the routing module 250 finds "21" in the target address column 610 of the routing table 600. It then follows the corresponding protocol type column 620 and the content of target column 630 to select the second data processing module 222 corresponding to the type "Modbus RTU" and the target "first virtual serial fieldbus port (virtual Modbus RTU port)". The fieldbus frame containing the target data is provided to the selected second data processing module 222. The selected second data processing module 222 then transfers the fieldbus frame containing the target data to the target device via the first virtual serial fieldbus port (second fieldbus port 240) through the application interface corresponding to the first virtual serial fieldbus port. If the second data processing module 222 can transfer fieldbus frames via several second fieldbus ports 240, the routing module 250 can also provide the information of the second fieldbus ports 240 that transmit fieldbus frames to the second data processing module 222 while providing the fieldbus frame containing the target data to the second data processing module 222. The second data processing module 222 thus knows which second fieldbus ports 240 to use to transmit the fieldbus frame containing the target to the target device.

The routing module 250 also determines whether the target address extracted from the fieldbus frame by the first data processing module 221 is valid. If it is invalid, the fieldbus frame is returned to the first data processing module 221 for abandoning the fieldbus frame with the invalid target address. For example, suppose the target address extracted by the first data processing module 221 is "61". The routing module 250 cannot find any data corresponding to "61" in the target address column 610 of the routing table 600. Therefore, the routing module 25 determines that the target address is invalid. Nonetheless, the method used by the routing module 250 to determine the validity of the target address is not limited to this particular example.

The routing module 250 further determines whether the fieldbus protocols used by the first data processing module 221 and the second data processing module 222 are the same. When they are different, the routing module 250 can provide the fieldbus protocol type used by the first data processing module 221 that receives fieldbus frames and the fieldbus protocol type used by the second data processing module 222 that transmits fieldbus frames to the frame format converting module 260. For example, the fieldbus protocol type used by the first data processing module 221 is "Modbus TCP", and that used by the second data processing module 222 is "Modbus RTU". The routing module 250 can provide both the current fieldbus frame type Modbus TCP" and the converted type "Modbus RTU" to the frame format converting module 260.

The frame format converting module 260 converts the fieldbus frame type provided by the routing module 250 into the fieldbus frame type used by the second data processing module 222 that transmits fieldbus frames, i.e., the frame format of the fieldbus used by the second data processing module 222.

Figure 5A:
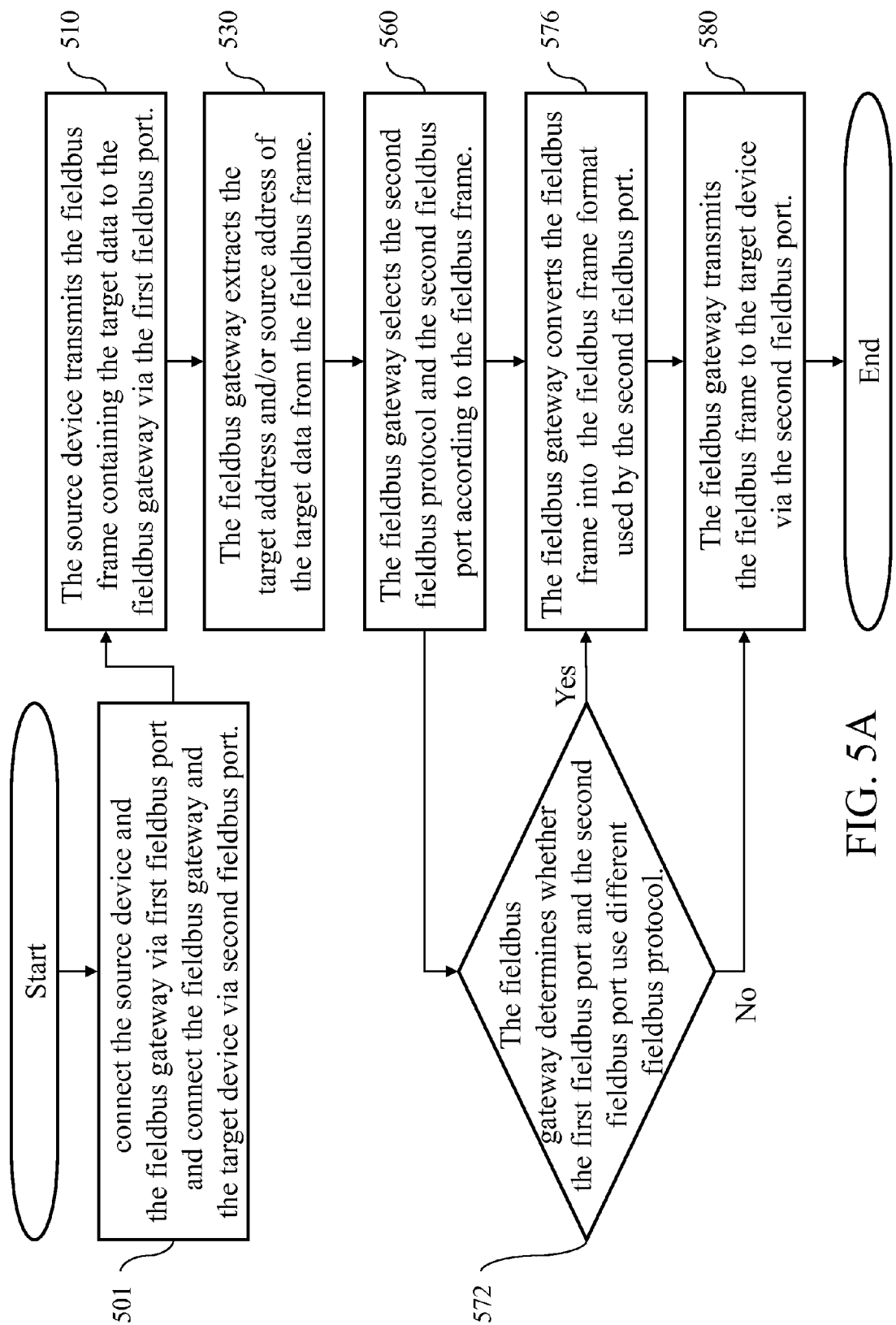
FIG. 5A is a flowchart of the data transmitting method using the virtual serial fieldbus port.

In the following, one embodiment is used to explain the device and method of the invention. Please refer to FIG. 5A for a flowchart of the disclosed data transmission method using a virtual serial fieldbus port.

Figure 6:
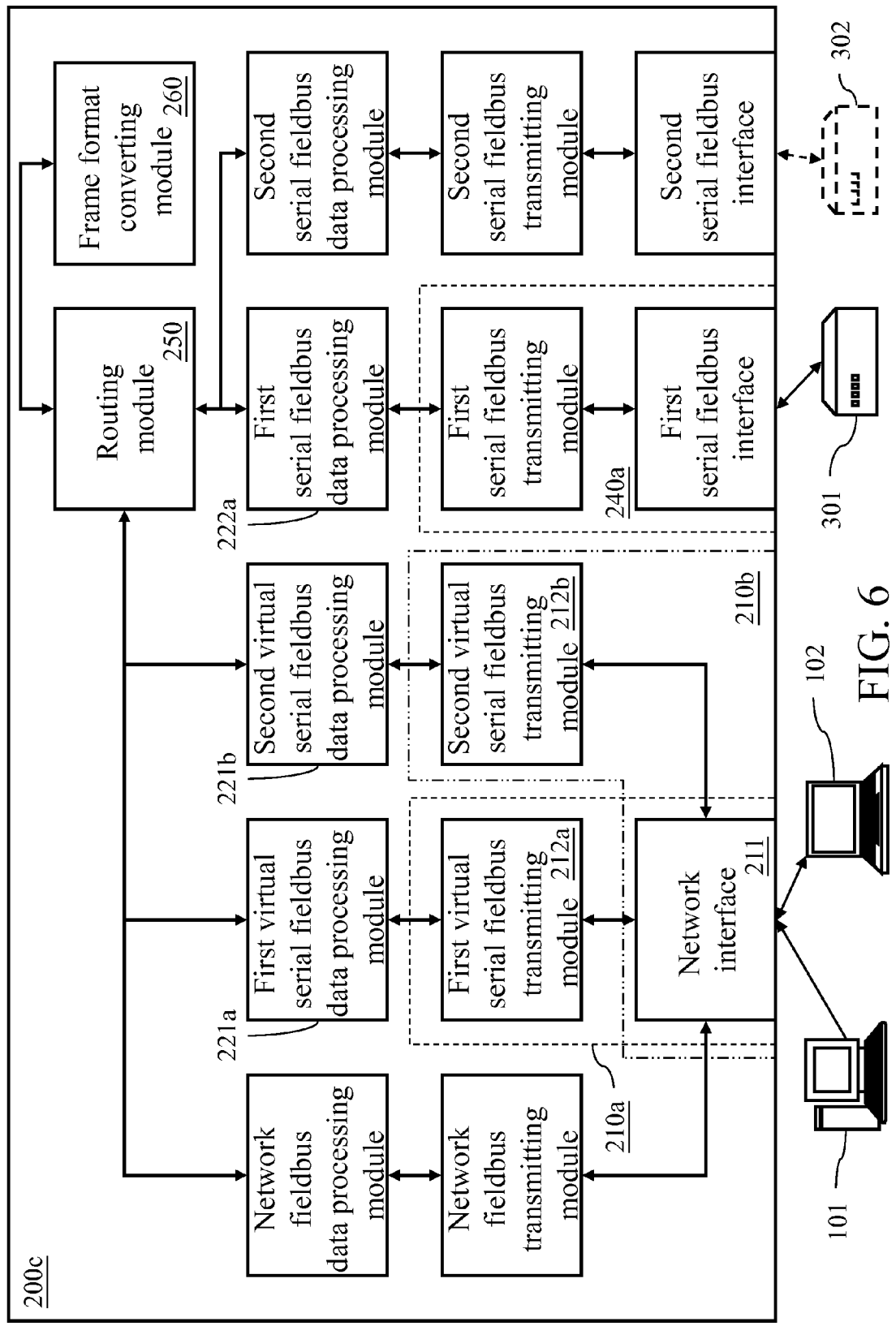
FIG. 6 is a schematic view of the elements in the disclosed fieldbus gateway.

In this embodiment, suppose the source device is a first network device 101, and the target device is a first serial fieldbus device 301, as the system structure shown in FIG. 2. The first network device 101 is a SCADA system. The first serial fieldbus device 301 is a programmable logic controller (PLC). The invention, however, is not limited to this particular example. Moreover, suppose the fieldbus gateway 200c, as shown in FIG. 6, contains a network interface 211 and two serial fieldbus interfaces. The network fieldbus transmission module, the first virtual serial fieldbus transmission module 212a, the second virtual serial fieldbus transmission module 212b share the network interface 211 to transmit/receive data. The first serial fieldbus transmission module and the second serial fieldbus transmission module use the first serial fieldbus interface and the second serial fieldbus interface to transmit data, respectively. Moreover, the first serial fieldbus transmission module/the serial fieldbus transmission module are combined respectively with the first serial fieldbus interface/the second serial fieldbus interface into a first serial fieldbus port 240a/a second serial fieldbus port. Besides, the first virtual serial fieldbus transmission module 212a and the second virtual serial fieldbus transmission module 212b are combined respectively with the network interface 211 to form a first virtual serial fieldbus port 210a and a second virtual serial fieldbus port. The fieldbus gateway disclosed herein is not limited to that in FIG. 6.

When a user wants to use the SCADA system (first network device 101) to operate the PLC (first serial fieldbus device 301), the fieldbus gateway 200c first needs to establish a connection between the SCADA system and the PLC (step 501). In this embodiment, the fieldbus gateway 200c includes two serial fieldbus ports. Thus, the fieldbus gateway 200c uses the first serial fieldbus port 240a to connect to the PLC. The fieldbus gateway 200c connects to the SCADA system via a network 400 (FIG. 2). Between the SCADA system and the fieldbus gateway 200c, the virtual serial fieldbus communications between the third virtual serial fieldbus port of the SCADA system and the first virtual serial fieldbus port 210a of the fieldbus gateway 200c is through the network 400. However, the invention is not limited to this.

When the user operates the SCADA system, it sends the target data to be transmitted to the PLC via the third virtual serial fieldbus port to the first virtual serial fieldbus port 210a (first fieldbus port 210) of the fieldbus gateway 200c (step 510). In this embodiment, the target data transmitted by the SCADA system are assumed to be ordinary operating commands. However, the invention is not limited to this possibility.

When the SCADA system sends the operating commands (target data) to the fieldbus gateway 200c, the network interface 211 of the fieldbus gateway 200c receives the fieldbus frame containing the operating commands transmitted from the SCADA system.

Afterwards, the first virtual serial fieldbus transmission module 212a of the fieldbus gateway 200c provides the fieldbus frame received by the network interface 211 via the corresponding application interface to the first virtual serial fieldbus data processing module 221a (first data processing module 221 in FIG. 3A) of the fieldbus gateway 200c. The first virtual serial fieldbus data processing module 221a extracts the target address and/or source address of the operating commands from the fieldbus frame containing the operating commands (step 530). In this embodiment, suppose the first virtual serial fieldbus data processing module 221a only needs to extract the target address from the fieldbus frame containing the operating commands. The extracted target address is, for example, "42". However, the target address mentioned herein is not limited to this example.

Figures 5B, 5C:
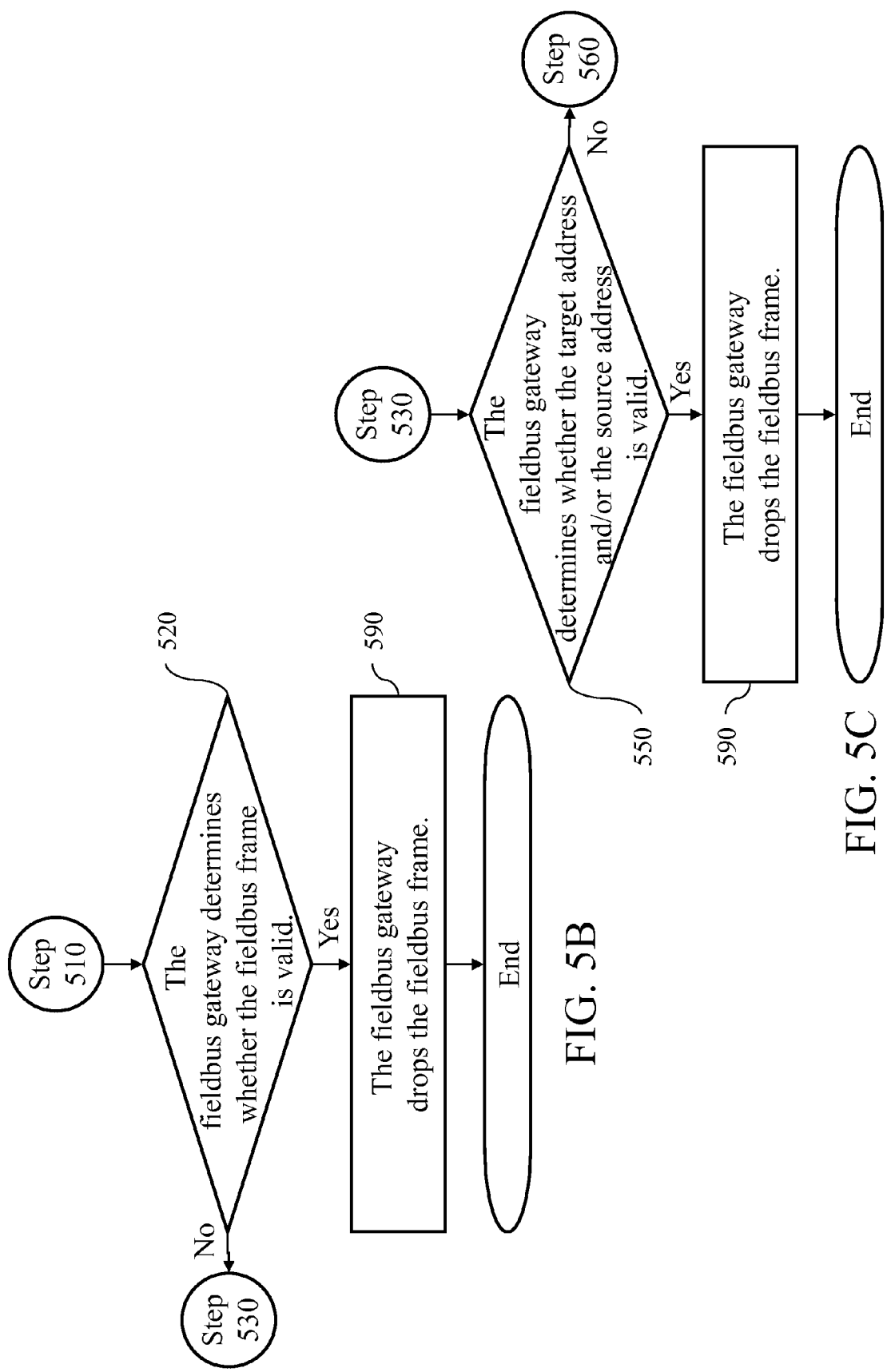
FIG. 5B is a flowchart for the optional fieldbus frame checking method of the invention.
FIG. 5C is a flowchart for the optional target address checking method of the invention.

In practice, before the first virtual serial fieldbus data processing module 221a extracts the target address and/or source address of the operating commands from the fieldbus frame containing the operating commands (step 530), the first virtual serial fieldbus data processing module 221a further determines whether the fieldbus frame is valid (step 520), as shown by the flowchart in FIG. 5B. If it is invalid, the first virtual serial fieldbus data processing module 221a has to abandon the fieldbus frame (step 590). In this embodiment, suppose the first virtual serial fieldbus data processing module 221a determines the validity of the fieldbus frame by its format. If the fieldbus frame format is correct, then the first virtual serial fieldbus data processing module 221a determines that the fieldbus frame is valid. If the fieldbus frame format is not correct, then the first virtual serial fieldbus data processing module 221a determines the fieldbus frame as invalid. Nevertheless, the method used by the first virtual serial fieldbus data processing module 221a to determine the validity of fieldbus frame is not limited to this example.

After the first virtual serial fieldbus data processing module 221a of the fieldbus gateway 200c extracts the target address and/or source address from the fieldbus frame (step 530), the routing module 250 follows the target address and/or source address extracted by the first virtual serial fieldbus data processing module 221a to select a fieldbus protocol and the corresponding fieldbus port (step 560), thereby continuing the subsequent task of transmitting the target data. In this embodiment, the first virtual serial fieldbus data processing module 221a only needs to extract the target address "42". If the routing module 250 uses the routing table 600 as shown in FIG. 4 to select the fieldbus protocol and the corresponding fieldbus port, then the fieldbus protocol (second fieldbus protocol) and the fieldbus port (second fieldbus port) corresponding to the target address "42" selected by the routing module 250 are respectively "Modbus ASCII" and "first serial fieldbus port" 240a.

In practice, before the routing module 250 selects the fieldbus protocol and the corresponding fieldbus port (step 560), the routing module 250 further determines whether the target address/source address/source and target addresses are valid (step 550), as shown in FIG. 5C. If the routing module 250 determines that the target address/source address/source and target addresses are invalid, then the routing module 250 returns the fieldbus frame back to the first virtual serial fieldbus data processing module 221a. After the first virtual serial fieldbus data processing module 221a receives the fieldbus frame returned from the routing module 250, it drops the fieldbus frame (step 590). In this embodiment, suppose the routing module 250 uses whether the target address and the source address exist in the routing table 600 to determine whether they are valid. Since the first virtual serial fieldbus data processing module 221a does not extract the source address, the routing module 250 only judges the validity of the target address. If the target address exists in the routing table 600, the routing module 250 determines the validity of the target address. On the other hand, if the target address does not exist in the routing table 600, the routing module 250 determines that the target address is invalid. However, the method used by the routing module 250 to determine the validity of the target address or source address is not limited to checking whether they exist in the routing table 600.

After the routing module 250 selects the fieldbus protocol and the corresponding fieldbus port (step 560), the routing module 250 determines that the fieldbus protocols used by the first virtual serial fieldbus port 210a (first fieldbus port) and the first serial fieldbus port 240a (second fieldbus port) are different (step 572). This is done according to the fieldbus protocol type "Modbus RTU" used by the first virtual serial fieldbus port 210a to receive target data and the fieldbus protocol type "Modbus ASCII" used by the first serial fieldbus port 240a to transmit target data according to the protocol type column 620 of the routing table 600 in FIG. 4. Therefore, the frame format converting module 260 converts the fieldbus frame containing the operating commands from the format of the first virtual serial fieldbus port 210 into the format used by the first serial fieldbus port 240a (step 576). That is, in this embodiment, the frame format converting module 260 converts the fieldbus frame from the fieldbus protocol type "Modbus RTU" to the fieldbus frame type "Modbus ASCII". However, the invention is not limited by this example.

After the disclosed frame format converting module 260 converts the fieldbus frame into the format used by the first serial fieldbus port 240a (second fieldbus port) (step 576), the routing module 250 provides the converted fieldbus frame to the first serial fieldbus data processing module 222a (second data processing module 222 in FIG. 3A). Besides, if the routing module 250 determines that the fieldbus frame formats used by the first fieldbus port and the second fieldbus port are the same (step 572), then the routing module 250 directly provides the unconverted fieldbus frame to the second data processing module 222.

After the routing module 250 provides the fieldbus frame to the first serial fieldbus data processing module 222a (second data processing module 222), the first serial fieldbus data processing module 222a transmits the fieldbus frame containing the operating commands via the first serial fieldbus port 240a (second fieldbus port) to the serial fieldbus port of the PLC (step 580). That is, the application interface corresponding to the first serial fieldbus transmitting module (common serial application interface) is used to provide the converted fieldbus frame to the first serial fieldbus transmitting module of the first serial fieldbus port 240a. The first serial fieldbus transmitting module transmits the fieldbus frame containing the operating commands via the first serial fieldbus interface of the first serial fieldbus port 240a to the serial fieldbus port of the PLC. The PLC thus acts according to the operating commands.

Figure 5D:
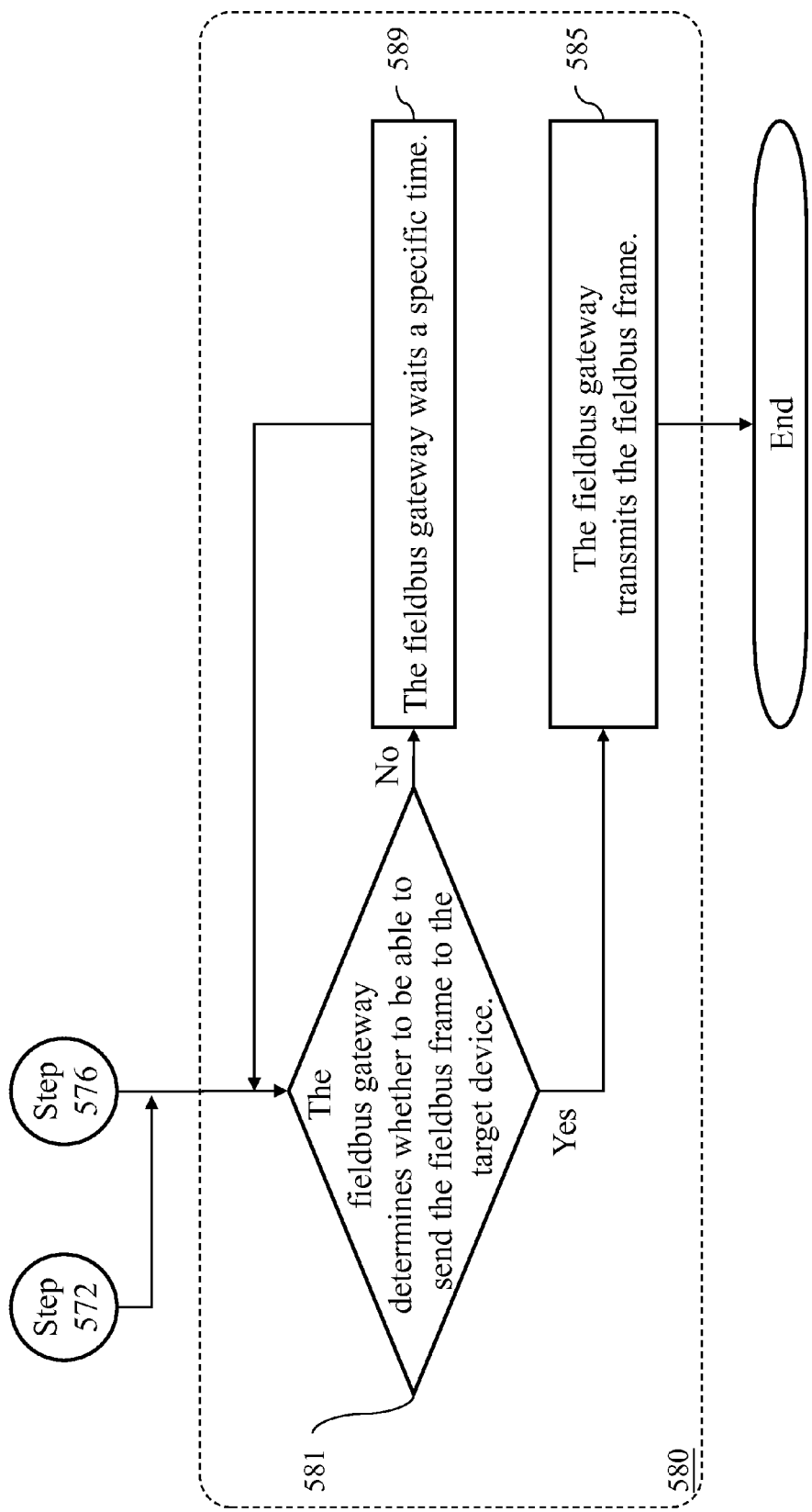
FIG. 5D is a detailed flowchart of transmitting a fieldbus frame according to the invention.

In fact, when the first serial fieldbus data processing module 222a transmits the fieldbus frame containing the operating commands to the PLC via the first serial fieldbus port 240a (step 580), the first serial fieldbus data processing module 222a can determine whether the fieldbus frame can be transmitted to the PLC via the application interface corresponding to the first serial fieldbus port 240a, as shown in FIG. 5D (step 581). In this embodiment, suppose the first serial fieldbus data processing module 222a uses the activity of the CTS signal recorded by the first serial fieldbus transmitting module of the first serial fieldbus port 240a to determine whether the fieldbus frame can be transmitted to the PLC. If fieldbus data processing module 222a obtain an inactive CTS signal which recorded by the first serial fieldbus transmitting module via the application interface, then it means that the buffer of PLC is full and temporarily unable to receive fieldbus frames. In this case, the first serial fieldbus data processing module 222a determines that the fieldbus frame cannot be sent now. The first serial fieldbus data processing module 222a then waits a specific time (step 589). Afterwards, it further determines whether the fieldbus frame can be transmitted to the PLC via the application interface corresponding to the first serial fieldbus transmitting module (step 581). If fieldbus data processing module 222a obtain an active CTS signal which recorded by the first serial fieldbus transmitting module via the application interface, it means that the PLC can receive fieldbus frames. Then the first serial fieldbus data processing module 222a transmits the fieldbus frame to the PLC via the first serial fieldbus port 240a (step 585).

According to the above description, the SCADA system can follow the same procedure to transmit control commands to the second serial fieldbus device 302 and/or the third serial fieldbus device 303.

When the second network device 102 (assumed to be a computer, as an example) uses the fourth virtual serial fieldbus port to connect the second virtual serial fieldbus port of the fieldbus gateway 200c via the network 400, it can also send control commands to the PLC (first serial fieldbus device 301) in the same way as what the SCADA system does.

For example, when the second virtual serial fieldbus transmitting module 212b of the fieldbus gateway 200c receives the control command of reading data on the network interface 211, the second virtual serial fieldbus transmitting module 221b extracts the target address "48" from the fieldbus frame containing the control command (step 530). The routing module 250 follows the target address to select the fieldbus protocol type for transmitting the control command as "Modbus ASCII" and the fieldbus port for transmitting the control command as "first serial fieldbus port 240a" from the routing table 600 in FIG. 4 (step 560). Since the routing module 250 determines that the fieldbus frame formats of the fieldbus protocol "Modbus RTU" used by the second virtual serial fieldbus port and the fieldbus protocol "Modbus ASCII" used by the first serial fieldbus port 240a are different (step 572), the frame format converting module 260 converts the fieldbus frame format into the fieldbus protocol format used by the first serial fieldbus port 240a (step 576). Afterwards, the first serial fieldbus data processing module 222a provides the fieldbus frame to the first serial fieldbus transmitting module of the first serial fieldbus port 240a via the application interface, so that the first serial fieldbus port 240a can transmit the fieldbus frame containing the control command to the PLC (step 580). In addition to receiving the control command transmitted from the first network device 101, the PLC also receives the control command of reading data transmitted from the second network device 102.

After the PLC receives the control command of reading data, it reads the target data from internal memory accordingly. Via the serial fieldbus connecting line of the serial fieldbus port, it returns the response frame containing the target data to the fieldbus gateway 200c (step 510). Since the PLC is the data transmitting end in this case, it is the source device of the invention now. The receiving end which PLC returns the response frame to, i.e., the second network device 102, is the target device of the invention.

After the first serial fieldbus port 240a of the fieldbus gateway 200c receives the response frame containing the target data transmitted from the PLC (step 510), the first serial fieldbus transmitting module of the first serial fieldbus port 240a provides the response frame containing target data returned by the PLC to the first serial fieldbus data processing module 222a (first data processing module 221 in FIG. 3A) via the application interface. After the first serial fieldbus data processing module 222a determines that the response frame containing target data received by the first serial fieldbus port 240a is corresponding to the previously transmitted control command, the target address is extracted from the response frame (step 530). However, the response frame of "Modbus RTU" or "Modbus ASCII" contains only the source address but not the target address, the response frame received by the first serial fieldbus port 240a in this embodiment contains only the source address but not the target address. Therefore, the first serial fieldbus data processing module 222a would try to find a virtual address as the target address of the response frame. In this case, the virtual address was generated corresponding to second virtual serial fieldbus port when the routing module 250 provides the fieldbus frame containing the control command to the first serial fieldbus data processing module 222a, This virtual address was also treated as the source address of the fieldbus frame containing the control command and transmitted together with the target address "48" to the first serial fieldbus data processing module 222a. Suppose the virtual address is "32". After that, the first serial fieldbus data processing module 222a temporarily stored the target address "48" and the source address "32" internally. Therefore, when the first serial fieldbus data processing module 222a determines that the received fieldbus frame is the response frame for the previous fieldbus frame containing the control command, it extracts the source address "48" from the response frame and compares with the temporarily stored target address. After finding the source address that is the same as the temporarily stored target address, the source address "32" is taken as the target address of the response frame. The response frame and the target address "32" thereof are then sent to the routing module 250.

After the first serial fieldbus data processing module 222a provides the target address of the response frame to the routing module 250, the routing module 250 looks up the target address in the routing table 600. It selects the fieldbus protocol type for transmitting the response frame as "Modbus RTU", and selects the fieldbus port for transmitting the fieldbus frame as the second virtual serial fieldbus port 210b corresponding to the type "Modbus RTU" (step 560). Afterwards, the routing module 250 determines that the fieldbus frame formats of the fieldbus protocol types used by the first serial fieldbus port 240a and the second virtual serial fieldbus port 210b are different (step 572). Therefore, the frame format converting module 260 converts the response frame containing the target data from the fieldbus frame format used by the first serial fieldbus port 240a into the fieldbus frame format used by the second virtual serial fieldbus port 210b (step 576). Moreover, the routing module 250 provides the format converted response frame to the second virtual serial fieldbus data processing module 221b. The second virtual serial fieldbus data processing module 221b uses the application interface corresponding to the second virtual serial fieldbus transmitting module 212b to provide the format converted fieldbus frame to the second virtual serial fieldbus transmitting module 212b. Thus, the second virtual serial fieldbus port transmits the fieldbus frame containing the target data to the second network device 102 that has virtual serial fieldbus communications with the second virtual serial fieldbus port 210b (step 580).

In summary, the invention differs from the prior art in that the fieldbus gateway receives a fieldbus frame from the virtual serial fieldbus port connected with the source device. The fieldbus frame is used to determine the fieldbus protocol and the second fieldbus port for transmitting fieldbus frames, and to convert the fieldbus frame into the fieldbus frame format used by the second fieldbus port. The second fieldbus port then transmits the fieldbus frame to the target device. This technique can solve the problem that the prior art cannot simultaneously allow two remote devices to control the same controlled device using the serial fieldbus protocol. The remote source device/target device uses the virtual serial fieldbus port to achieve long-distance communications using serial fieldbus protocol. Moreover, the source device/target device can use a single virtual serial fieldbus port to communicate with multiple target devices/source devices concurrently.

Figure 7A:
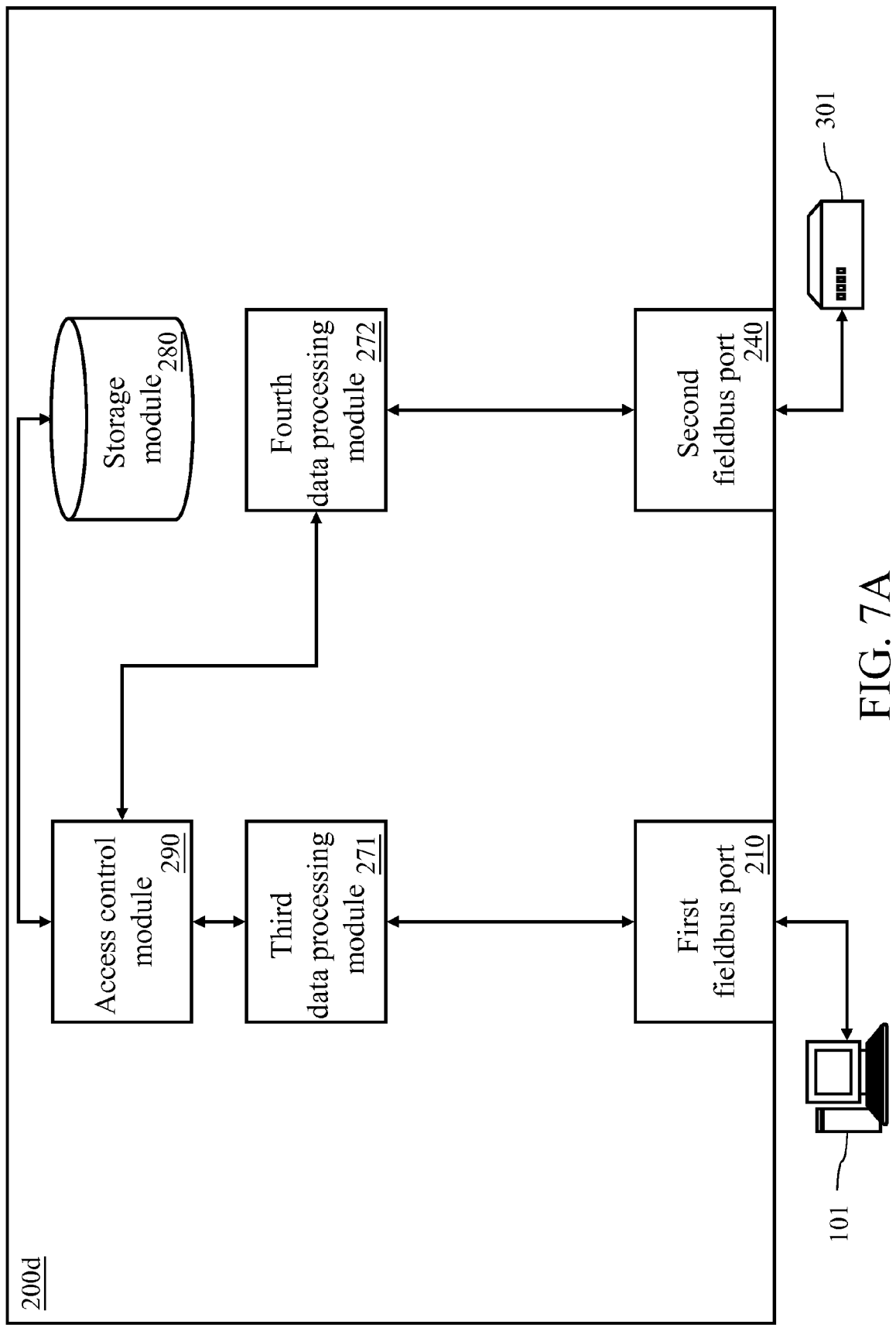
FIG. 7A shows the structure of another data transmitting system that uses the virtual serial fieldbus port according to the invention.

Please FIG. 7A for a second embodiment of the invention, which shows elements of the device that controls access memory according to purposes. As shown in the drawing, the disclosed fieldbus gateway 200d includes a first fieldbus port 210, a second fieldbus port 240, a third data processing module 271, a fourth data processing module 272, a storage module 280, and an access control module 290. The first fieldbus port 210 and the second fieldbus port 240 are the same as the first fieldbus port 210 and the second fieldbus port 240 of FIG. 3A. So they are not described again.

The third data processing module 271 and the fourth data processing module 272 are similar to the first data processing module 221 and the second data processing module 222. They are both in charge of the specification of network fieldbus protocol or serial fieldbus protocol. This part is the same as described before, and is thus not repeated again.

The thing that is different from the first data processing module 221 is that the third data processing module 271/the fourth data processing module 272 also receives the "request for data input" instructions sent from the access control module 280. The "request for data input" instructions received by the third data processing module 271/the fourth data processing module 272 include a read command, a starting address of the target data, a size of the target data, etc. The "request for data input" instructions of the invention are not limited to these examples. The third data processing module 271/the fourth data processing module 272 also receives the "data output" instructions sent from the access control module 290. The "data output" instructions received by the third data processing module 271/the fourth data processing module 272 include a write command, a starting address of the target data, a size of the target data, an actual target data, etc. However, the "data output" instructions of the invention are not limited to these examples.

The third data processing module 271/the fourth data processing module 272 can use the received "data output" instruction and the source address and/or target address sent from the access control module 290 to build a write command frame of the fieldbus used by the first fieldbus port 210/second fieldbus port 240. The write command frame is then provided via the application interface corresponding to the fieldbus data processing module of the first fieldbus port 210/second fieldbus port 240 according to the "data output" instruction to the first fieldbus port 210/second fieldbus port 240. The first fieldbus port 210/second fieldbus port 240 thus transmits the write command frame to the source device/address device.

The third data processing module 271/the fourth data processing module 272 can build a read command frame of the fieldbus used by the first fieldbus port 210/second fieldbus port 240 according to the received "request for data input" instruction and the source address and/or target address. A read command is provided via the application interface corresponding to the fieldbus data processing module of the first fieldbus port 210/second fieldbus port 240 to the first fieldbus port 210/second fieldbus port 240. The first fieldbus port 210/second fieldbus port 240 thus transmits the read command frame to the source device/address device.

The third data processing module 271/the fourth data processing module 272 also use the application interface corresponding to the fieldbus data processing module of the first fieldbus port 210/second fieldbus port 240 to obtain the response frame containing target data that is returned by the source device/target device in response to the read command frame. After obtaining the target data in the response frame, the target data are returned to the access control module 290.

The third data processing module 271/the fourth data processing module 272 further obtain the response frame contains the status of result (success or failure) in response to the write command frame. The response frame is returned from the source device/target device and obtained by the third data processing module 271/the fourth data processing module 272 via the application interface corresponding to the fieldbus data processing module of the first fieldbus port 210/second fieldbus port 240. After obtaining the status in the response frame, the status is returned to the access control module 290.

The third data processing module 271/the fourth data processing module 272 also obtain the read command frame of the fieldbus used by the first fieldbus port 210/second fieldbus port 240 transmitted from the source device/target device via the application interface corresponding to the fieldbus data processing module of the first fieldbus port 210/the second fieldbus port 240. It further extracts the read command and parameters from the read command frame. The parameters extracted by the third data processing module 271/the fourth data processing module 272 includes a starting address of the target data, a size of the target data, etc. The parameters referred herein are not limited to this particular example.

The third data processing module 271/the fourth data processing module 272 sends out a "request for data output" instruction to the access control module 290 according to the received read command frame, and then receives the response of the "request for data output" instruction which contains the target data from the access control module 290. The target data and the source address and/or target address are used to build a response frame in response to the read command frame according to the fieldbus used by the first fieldbus port 210/second fieldbus port 240. The response frame is provided to the first fieldbus port 210/the second fieldbus port 240 via the application interface corresponding to the fieldbus data processing module thereof. The fieldbus port 210/the second fieldbus port 240 then transmits the response frame to the source device/target device.

The third data processing module 271/the fourth data processing module 272 further use the application interface corresponding to the fieldbus data processing module of the first fieldbus port 210/second fieldbus port 240 to obtain the write command frame of the fieldbus used by the first fieldbus port 210/second fieldbus port 240 transmitted from the source device/target device, and extracts the write command and parameters from the write command frame. The parameters extracted by the third data processing module 271/the fourth data processing module 272 includes a starting address of the target data, a size of the target data, an actual target data, etc. The invention, however, is not limited to this particular example.

The third data processing module 271/the fourth data processing module 272 sends out a "data input" instruction to the access control module 290 according to the received write command frame, and then receives the status of the result of the "data input" instruction (success or failure) transmitted from the access control module 290. The status and the source address and/or target address are used to build a response frame in response to the write command frame according to the fieldbus used by the first fieldbus port 210/second fieldbus port 240. The response frame is provided to the first fieldbus port 210/the second fieldbus port 240 via the application interface corresponding to the fieldbus data processing module of the first fieldbus port 210/the second fieldbus port 240. The first fieldbus port 210/the second fieldbus port 240 transmits the response frame to the source device/target device.

The third data processing module 271/the fourth data processing module 272 further determines whether the received response frame, write command frame or read command frame is valid. If it is invalid, the received frame is dropped. Generally speaking, the third data processing module 271/the fourth data processing module 272 determines whether the received frame is valid by the format thereof However, the method used by the third data processing module 271/the fourth data processing module 272 to determine the validity of the received frame is not limited to this example.

The storage module 280 store the target data of the source device/target device, and allows data be accessed by the access control module 290.

The access control module 290 sends out a "request for data input" instruction to the third data processing module 271/the fourth data processing module 272, and stores the target data extracted form the response of the "request for data input" instruction into the storage module 280. The access control module 290 defines the address mapping between the addresses in the read command frame/the write command frame and the addresses in the storage module 280. Thus, the access control module 290 can access the correct target data in the storage module 280 whenever receives the read command frame or write command from the source device or target device or sends the read command or write command frame to the source device or target device. According to the invention, the access address of the storage module 280 is called a "specified address". Generally speaking, the access control module 290 periodically sends out "request for data input" instructions to the third data processing module 271/the fourth data processing module 272 for the target data stored in the storage module 280 to be synchronized with the target data in the source device/target device.

The access control module 290 sends out "data output" instructions to the third data processing module 271/the fourth data processing module 272, then the third data processing module 271/the fourth data processing module 272 transmitting write command frame to the source device/target device. The "data output" instruction may include a write command, a size of the target data, an actual target data, and the specified address. Generally speaking, the access control module 290 periodically sends out "data output" instructions to the third data processing module 271/the fourth data processing module 272 for the target data stored in the storage module 280 to be synchronized with the target data in the source device/target device.

The access control module 290 also follows the write command, the starting address of the target data, the size of the target data, the actual target data extracted by the third data processing module 271/the fourth data processing module 272 to store the target data to the storage module 280 at the specified address. Generally speaking, the source device/target device periodically sends out write command frames to the third data processing module 271/the fourth data processing module 272 for the target data stored in the storage module 280 to be synchronized with the target data in the source device/target device.

The access control module 290 further uses the read command, the starting address of the target data, the size of the target data extracted by the third data processing module 271/the fourth data processing module 272 to read the target data at the specified address in the storage module 280. The target data are then returned to the third data processing module 271/the fourth data processing module 272.

In summary, the target data exchanges between the source device and the target device can be carried out in the following methods:

1. The fieldbus gateway 200d periodically sends out a read command frame to the target device/source device, thereby reading the target data and storing them in the storage module 280 of the fieldbus gateway 200d. At the same time, the source device/target device periodically sends out the read command frame to the fieldbus gateway 200d to read the target data stored in the storage module 280.

2. The target device/source device periodically sends out a write command frame to the fieldbus gateway 200d to store the target data in the storage module 280. At the same time, the source device/target device periodically sends out the read command frame to the fieldbus gateway 200d to read the target data stored in the storage module 280.

3. The source device/target device periodically sends out a write command frame to the fieldbus gateway 200d for storing the target data in the storage module 280. At the same time, the fieldbus gateway 200d periodically sends out the write command frame to the target device/source device for transmitting the target data stored in the storage module 280 to the target device/source device.

4. The fieldbus gateway 200d periodically sends out a read command frame to the target device/source device for reading the target data and storing them in the storage module 280. At the same time, the fieldbus gateway 200d periodically sends out a write command frame to the source device/target device for transferring the target data stored in the storage module 280 to the source device/target device.

Figure 7B:
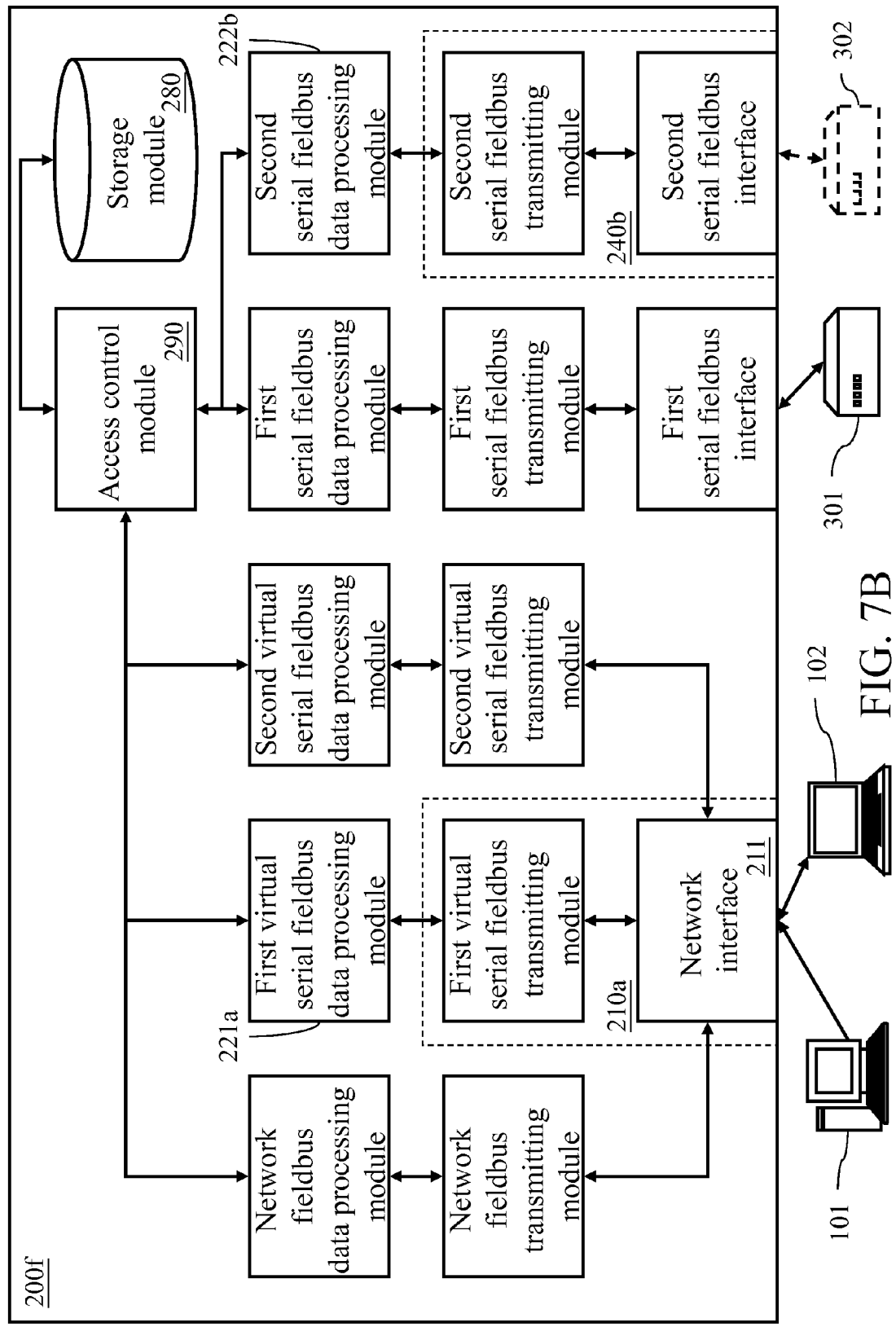
FIG. 7B shows the elements in another fieldbus gateway that uses the virtual serial fieldbus port according to the invention.

In the following, an embodiment using the first method mentioned above to explain how the disclosed device and method works. In this embodiment, the second network device 102 reads the target data stored in the second serial fieldbus device 302 via the fieldbus gateway 200f. The invention is not limited to this example. The elements of the fieldbus gateway 200f are shown in FIG. 7B. In practice, the other methods are more or less the same as the current embodiment. The only differences are in the active and passive relations in the data transmissions between the source device/target device and the fieldbus gateway 200d and in the transmitted data contents.

First, the access control module 290 of the fieldbus gateway 200f stores a predefined device memory address correspondence table. Suppose the device memory address correspondence table records that the addresses 0x3200 to 0x4000 of the storage module store the data in the address 0x0000 to 0x0E00 of the first network device 101, and that the addresses 0x3001 to 0x4000 of the storage module 280 store the data in the addresses 0x0001 to 0x1000 of the second serial fieldbus device 302. The invention is by no means limited to this particular example.

The access control module 290 periodically sends out a "request for data input" instruction to the second serial fieldbus data processing module 222b (the fourth data processing module 272) for reading the target data of the second serial fieldbus device 302. Suppose the "request for data input" instruction sent by the access control module 290 includes the read command, the starting address of the target data "0x0410", and the size of the target data "28 bytes".

After the second serial fieldbus data processing module 222b receives the "request for data input" instruction transmitted from the fieldbus gateway 200f, the second serial fieldbus data processing module 222b builds a read command frame of the fieldbus used by the second fieldbus port 240b according to the "request for data input" instruction and the target address of the second serial fieldbus device 302. It also uses the application interface corresponding to the second serial fieldbus transmitting module of the second serial fieldbus port 240b to provide the read command frame to the second serial fieldbus port 240b. The serial fieldbus port 240b then transmits the read command frame to the serial fieldbus port of the second serial fieldbus device 302.

After the second serial fieldbus device 302 receives the read command frame for reading the target data, it reads the target data from the address "0x0410" of internal memory. The obtained target data are composed into a response frame in response to the read command frame. The second serial fieldbus device 302 use the serial fieldbus port connected with the fieldbus gateway 200f to transmit the response frame back to the fieldbus gateway 200f.

After the second serial fieldbus port 240b of the fieldbus gateway 200f receives the response frame, the second fieldbus transmitting module of the second serial fieldbus port provides the response frame to the second serial fieldbus data processing module 222b via the corresponding application interface.

Afterwards, the second serial fieldbus data processing module 222b returns the target data to the access control module 290. After the access control module 290 receives the target data, they are written into the storage module 280 at the specified address corresponding to the second serial fieldbus device 302. The access control module 290 defines that the addresses 0x3001 to 0x4000 in the storage module store map to the data of the addresses 0x0001 to 0x1000 in the second serial fieldbus device 302. Therefore, the target data are stored from the address 0x3410 to 0x342B.

In this embodiment, the access control module 290 periodically sends out a read command to the second serial fieldbus data processing module 222b for reading the target data on the second serial fieldbus device 302. Thus, the second serial fieldbus data processing module 222b continuously reads the target data on the second serial fieldbus device 302, and uses the access control module 290 to update the target data stored from the address 0x3410 to 0x342B. As a result, the target data stored in the storage module 280 are synchronized with the target data stored in the second serial fieldbus device 302.

Suppose the first network device 101 uses its fifth virtual serial fieldbus port to have virtual serial fieldbus communications with the first virtual serial fieldbus port 210a on the fieldbus gateway 200f. If the first network device 101 wants to read the 28 bytes target data starting from 0x0410 of the second serial fieldbus device 302 and to store them in the internal memory starting from address 0x0210, the first network device 101 transmits a read command frame for reading the target data via the fifth virtual serial fieldbus port to the first virtual serial fieldbus port 210a of the fieldbus gateway 200f.

After the fieldbus gateway 200f receives the read command frame containing the read command from the network interface 21, the first virtual serial fieldbus transmitting module of the fieldbus gateway 200f uses the corresponding application interface to transmit the read command to the first virtual serial fieldbus data processing module 221*a* (the third data processing module 271 in FIG. 7A).

Afterwards, the first virtual serial fieldbus data processing module 221*a* extracts the read command from the read command frame, and sends out the "request for data output" instruction to transmit the read command, the size of the target data, and the starting address of the target data to the access control module 290. Suppose in this embodiment that the starting address of the target data and the size of the target data are "0x0210" and "28 bytes", respectively. The read command frame according to the invention is not limited to this particular example.

From the "request for data output" instruction transmitted from the first virtual serial fieldbus data processing module 221*a*, the access control module 290 extracts that the starting address of the target data is "0x0210" and the size of the target data is "28 bytes". Since the access control module 290 defines that in the storage module 280, the addresses 0x3200 to 0x4000 maps to the address 0x0000 to 0x0E00 of the first network device 101, the access control module 290 starts to read 28 bytes target data from specified address 0x3410 corresponding to the starting address "0x0210". Therefore, the access control module 290 can read the target data and transmit the target data to the first virtual serial fieldbus data processing module 221*a*.

The first virtual serial fieldbus data processing module 221*a* builds a response frame of the fieldbus used by the first virtual fieldbus port 210*a* according to the target data transmitted from the access control module 290. It further uses the application interface corresponding to the first virtual serial fieldbus transmitting module of the first virtual serial fieldbus port 210*a* to provide the response frame to the first virtual serial fieldbus port 210*a*. The first virtual serial fieldbus port 210*a* then returns to the response frame to the first network device 101. From above method, the first network device can synchronize the target data with the second serial fieldbus device 302 via the fieldbus gateway 200*f*.

In summary, the invention differs from the prior art in that after the fieldbus gateway receives the target data via the virtual serial fieldbus port connected with the source device or target device, the command frame is used to determine the fieldbus protocol and the fieldbus port to be used for transmitting the target data. The fieldbus port thus determined transmits the fieldbus frame containing the target data to the target device or the source device. This technique can solve the problem in the prior art that no two remote devices can use the serial fieldbus protocol to control the same controlled device at the same time. Using the invention, the remote source device/target device can use the virtual serial fieldbus port to achieve long-distance communications with serial fieldbus protocol. Therefore, the source device/target device can use a single virtual serial fieldbus port to communicate with multiple target devices/source devices concurrently.

Moreover, the disclosed method of transmitting data using a virtual serial fieldbus port can be implemented in hardware, software, or the combination thereof.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fieldbus gateway using a virtual serial fieldbus port comprising:

a network interface for transmitting or receiving network packets via a network, wherein the network packet includes a fieldbus frame;

at least one virtual serial fieldbus transmitting module, which is generated when the fieldbus gateway transmits or receives the network packet via the network interface, for simulating serial fieldbus port corresponding to fieldbus frame included in the network packet, and each of the virtual serial fieldbus transmitting module and the network interface make up virtual serial fieldbus ports;

at least one first data processing module corresponds to one of the virtual serial fieldbus port, each of the first data processing module processes behaviors defined by fieldbus protocol used by the fieldbus frame transmitted or received by the virtual serial fieldbus port;

at least one fieldbus port, which is physical serial fieldbus port or network fieldbus port, for receiving or transmitting fieldbus packets, wherein fieldbus protocol used by the fieldbus frames corresponding to the fieldbus port receiving or transmitting;

at least one second data processing module corresponds to one of the fieldbus port, for processes behaviors defined by fieldbus protocol used by the fieldbus frame received or transmitted by the fieldbus port;

a routing module for selecting the fieldbus protocol based on the fieldbus frame received by the virtual serial fieldbus port or the fieldbus port;

a frame format converting module for converting the fieldbus frame into the fieldbus frame format used by the selected fieldbus protocol;

wherein the routing module provides the converted fieldbus frame to one of the first data processing module or the second data processing module corresponding to the selected fieldbus protocol, and the first data processing module received the converted fieldbus frame transmits the converted fieldbus frame via the virtual serial fieldbus port corresponding to or the second data processing module received the converted fieldbus frame transmits the converted fieldbus frame via the fieldbus port corresponding to.

2. The fieldbus gateway of claim 1, wherein virtual serial fieldbus transmitting module further includes:

a fieldbus transmission simulating unit for receiving or transmitting the target data via the network interface;

a fieldbus data and physical signal simulating unit for receiving or transmitting the target data via the fieldbus transmission simulating unit; and an application command processing unit for reading the target data received by the fieldbus data and physical signal simulating unit or outputting the target data to the fieldbus data and physical signal simulating unit.

3. The fieldbus gateway of claim 2, wherein the fieldbus data and physical signal simulating unit sets a virtual physical interface, provides the settings and reading of the interface parameters thereof, and generates and processes a physical signal and a status to simulate the fieldbus physical layer; the fieldbus transmission simulating unit uses the virtual physical interface to establish and manage the connections with a device connecting with the fieldbus gateway, receives or transmits the physical signal and the status to simulate the physical fieldbus transmissions; and the application command processing unit uses the fieldbus data and physical signal simulating unit to set or read the interface parameters and the status.

4. The fieldbus gateway of claim 2, wherein the first fieldbus port or the second fieldbus port further includes a fieldbus data link layer simulating unit for encapsulating the target data read by the application command processing unit into a fieldbus frame and simulates the data link layer processing mechanism provided by the physical fieldbus controller.

5. The fieldbus gateway of claim 1, wherein the first data processing module further determines whether the fieldbus frame is valid and the fieldbus frame is dropped when the first data processing module determines the fieldbus frame as invalid.

6. The fieldbus gateway of claim 1, wherein the routing module further determines whether the target address and/or the source address is valid, and the fieldbus frame is dropped by the first data processing module when the routing module determines that the target address and/or the source address is invalid.

7. The fieldbus gateway of claim 1, wherein the fieldbus port includes a serial fieldbus interface and corresponds to serial fieldbus protocol corresponding with the serial fieldbus interface when the fieldbus is the physical serial fieldbus port.

8. The fieldbus gateway of claim 1, wherein the fieldbus port includes the network interface and corresponds to a network fieldbus protocol when the fieldbus is the network fieldbus port.

9. The fieldbus gateway of claim 1, wherein the second data processing module transmitting the converted fieldbus frame further receives a response frame corresponding with the converted fieldbus frame and determines whether a source address of the response frame and a target address of the converted fieldbus frame are the same, the routing module further selects the serial fieldbus protocol based on a virtual address, which established before the second data processing module sends the converted fieldbus frame, correspond a virtual serial fieldbus port receiving the fieldbus frame when the source address is the same as the target address, the frame format converting module further converts the response frame into the fieldbus frame format used by the serial fieldbus protocol, the first data processing module corresponding with the serial fieldbus protocol further processes behaviors defined by the serial fieldbus protocol, and the virtual serial fieldbus port corresponding with the serial fieldbus protocol further transmits the converted response frame via the network.

* * * * *